(12) United States Patent
Fischer

(10) Patent No.: US 6,457,211 B2
(45) Date of Patent: Oct. 1, 2002

(54) HOSE WIRE-CLAMP ARRANGEMENT

(75) Inventor: Daniel Fischer, Romanshorn (CH)

(73) Assignee: Eugster/Frismag AG, Romanshorn (CH)

( * ) Notice: Subject to any disclaimer, the term of this patent is extended or adjusted under 35 U.S.C. 154(b) by 0 days.

(21) Appl. No.: 09/751,386

(22) Filed: Jan. 2, 2001

(30) Foreign Application Priority Data

Dec. 31, 1999 (DE) ...................................... 299 23 062 U

(51) Int. Cl.[7] ................................................. F16L 33/02
(52) U.S. Cl. ............................. 24/20 R; 24/26; 24/27; 24/28; 24/29; 403/322.1; 285/23
(58) Field of Search ............................. 403/322.1, 325, 403/326, 327, 316, 317; 24/20 R, 26, 27, 28, 29; 285/23, 252

(56) References Cited

U.S. PATENT DOCUMENTS

| | | | | | |
|---|---|---|---|---|---|
| 4,296,534 A | * | 10/1981 | Nagano | ........................... | 24/27 |
| 4,426,754 A | * | 1/1984 | Smith et al. | .............. | 24/115 R |
| 5,138,747 A | * | 8/1992 | Oetiker | ................... | 24/20 CW |
| 5,490,662 A | * | 2/1996 | Wright | ........................ | 267/182 |
| 5,620,209 A | * | 4/1997 | Sauer | .......................... | 24/20 R |
| 5,996,186 A | * | 12/1999 | Yamada et al. | ........... | 24/20 EE |
| 6,022,166 A | * | 2/2000 | Rogers et al. | ........... | 248/503.1 |
| 6,038,744 A | * | 3/2000 | Zielinski | ................... | 24/20 EE |
| 6,098,251 A | * | 8/2000 | Zielinski | ................... | 24/20 EE |

FOREIGN PATENT DOCUMENTS

| | | |
|---|---|---|
| DE | 195 39 440 | 4/1997 |
| IT | 492541 | 3/1954 |
| JP | 09004776 | 1/1997 |

* cited by examiner

*Primary Examiner*—Robert J. Sandy
*Assistant Examiner*—Andreé Jackson
(74) *Attorney, Agent, or Firm*—Venable; Norman N. Kunitz

(57) ABSTRACT

A hose wire-clamp arrangement includes a hose clamp (1) that comprises a helical, resilient wire, which is angled outward nearly radially or circumferentially at at least one end portion (3) and at one further portion (6). To allow the hose wire-clamp (1) to be mounted to a fitting such that it can be released easily without a tool and, once mounted, can withstand high internal pressure on the hose, a retaining sheet (2) having two spaced cutouts (8, 9) is detachably mounted to the hose wire-clamp (1) such that each of the two angled portions (3,6) rests against a respective one of the two cutouts (8, 9).

14 Claims, 1 Drawing Sheet

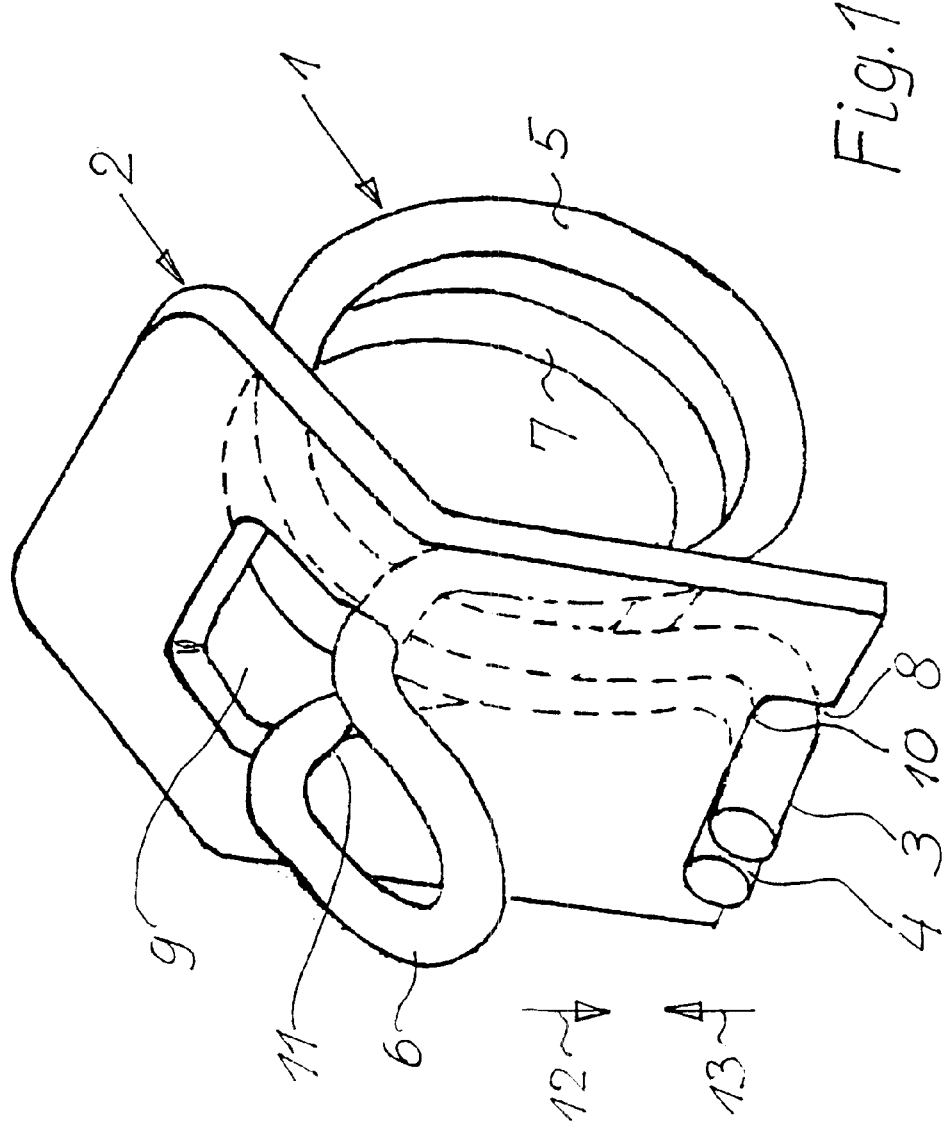

HOSE WIRE-CLAMP ARRANGEMENT

CROSS-REFERENCE TO THE APPLICATION

The present application claims the right of foreign priority of German Application No. DE 299 23 062.7 filed Dec. 31, 1999, the subject matter of which is incorporated herein by reference.

BACKGROUND OF THE INVENTION

The invention relates to a hose wire-clamp arrangement that comprises a helical, resilient wire, which is angled outward nearly radially or circumferentially at at least one end portion and at a further portion.

Known hose wire-clamps of the above type are used, for example, to connect hoses in household appliances, and/or to household appliances, in a relatively low-pressure range of typically up to 8 bar. When a hose wire-clamp of this type is not clamped, it has a slightly smaller clearance diameter than the outside diameter of the hose that it clamps to, for example, a fitting. For hose assembly, the wire connecting clamp is first pushed onto the hose, and the hose is placed onto the fitting. To clamp the hose securely to the fitting, the angled portions of the hose wire-clamp are pressed together, which opens the wire-grip, i.e., its clearance diameter increases. In this way, it can be positioned on the hose in the region of the connecting element. In the correct position, the angled portions of the hose wire-clamp are released, whereby the clamp contracts and secures the hose to the fitting in a frictional lockup. A disadvantage of this hose wire-clamp is that, at higher pressure, for example, higher than 8 bar, the hose wire-clamp can be expanded by the pressure in the hose, counter to the spring effect of the helical wire, causing the connection to loosen, and possibly even causing the hose to detach from the fitting.

These disadvantages are avoided in a hose wire-clamp that employs a different type of frictional lockup, in which eyelets are pressed together with a pair of pressing tongs. This hose wire-clamp, which is irreversibly deformed in the assembly process, cannot be pried apart by a service technician. Thus, it is necessary, for example, to cut the clamp open and replace it with a new hose wire-clamp. Aside from the associated material requirement, it is disadvantageous that assembling the hose wire-clamp with pressing tongs requires a large open handling area.

SUMMARY OF THE INVENTION

It is the object of the invention to create a hose wire-clamp of the type mentioned at the outset, which is suitable for a frictional-lockup connection of a hose to a fitting, and is easy to mount, without tools, yet can be released and re-used, and is suited to withstand high pressure in the hose or the fitting without loosening and releasing the hose.

This object is accomplished by a hose wire-clamp arrangement according to the invention including-a hose wire-clamp of the above initially described type that is provided with a retaining sheet. The sheet has two cutouts, which are spaced from one another, and at which a respective angled section of the hose wire-clamp rests in the assembled state of the hose wire-clamp arrangement. The retaining sheet prevents the helical, resilient wire from automatically expanding, even under high pressure in the hose, because the retaining sheet prevents its two angled sections from moving toward one another. If, however, the hose connection is to be released, the retaining sheet can be removed from the angled portions of the helical, resilient wire, after which the angled sections can readily be manually pressed together. Aside from the mounting of the retaining sheet, and its removal from the hose wire-clamp, the clamp is handled conventionally.

For the retaining sheet to perform the retaining function, and the hose wire-clamp to remain in a secure, frictional-lockup connection with the hose, even under relatively high pressure, the retaining sheet is dimensioned such that the distance between the edges of the two sheet cutouts facing one another is at least as large as the distance between the two angled sections of the hose wire-clamp in the relaxed state.

With the width of the retaining sheet extending perpendicular to the aforementioned distance, the correct positioning of the hose wire-clamp on the fitting can be predetermined and easily controlled.

According to the preferred embodiment of the invention, the hose wire-clamp arrangement includes a hose wire-clamp that extends from the first angled portion, over a first helical portion, a connecting portion that is angled and partially curved backward in an approximate U shape, as a second curved portion, and over a second helical portion, to a third angled portion, with the first and third angled portions lying close together and the two helical portions of the resilient wire lying between two legs of the second angled portion. This hose wire-clamp advantageously includes a retaining sheet, which has as a first cutout an open cutout at an end portion or edge and, at a distance from this, a hole as a second cutout in a closed portion of the retaining sheet. The retaining sheet can be easily and reliably mounted onto the hose wire-clamp that is positioned on the hose and clamps it, such that the sheet is tipped with its open cutout onto the first and third angled portions of the hose wire-clamp, and is then pivoted onto the connecting portion that is angled and partially curved backward in an approximate U shape. The second angled portion is thereby snapped into the hole of the retaining sheet. Afterward, the first and third angled portions of the hose wire-clamp rest against the first open cutout of the retaining sheet, and the second angled portion is positioned in the hole representing the second cutout of the retaining sheet, so the sheet is captively secured.

An exemplary embodiment of the invention is described below in connection with a drawing with a single FIGURE, from which ensue further features, particularly with respect to the shaping of the hose wire-clamp and the retaining sheet, their cooperation and the attained advantages.

BRIEF DESCRIPTION OF THE DRAWING

FIG. 1 is a schematic illustration of a hose wire-clamp having a retaining sheet that is detachably connected to the wire-clamp according to the invention.

DETAILED DESCRIPTION OF THE PREFERRED EMBODIMENTS

In FIG. 1, a hose wire-clamp is generally represented by 1, while 2 represents a retaining sheet that can be detachably mounted on the wire-clamp.

The hose wire-clamp 1 includes at its one end a first angled portion 3, and, at its other end, a so-called third angled portion 4, which lies close to the first angled portion 3. A first helical portion 5 extends from the first angled portion 3, and changes over to a connecting portion 6, which forms a so-called second angled portion. Analogously, a second helical portion 7 extends from the third angled portion 4 to the common connecting portion 6. The hose wire-clamp 1 is thus curved such that the two helical portions 5 and 7 are surrounded by the connecting portion 6 in the region of the connecting portion 6. As can be seen from FIG. 1, the connecting portion 6, has an approximate closed-U shape, specifically such that an outer part is curved backward toward the first angled portion 3 and the third angled portion 4; and the two helical portions extend between the legs of the U-shaped portion 6.

Before the retaining sheet 4 is bent as shown, it is essentially rectangular. A first open cutout 8 is notched out of the sheet at one edge. At a distance from this cutout 8, in a closed portion of the sheet 4, is a nearly rectangular hole 9. An edge 10 of the first cutout 8 is the most closely adjacent to an edge 11 of the rectangular hole 9, the edge only being indicated in the FIGURE. The linear distance between the edges 10 and 11 is at least as large as the distance between the angled portions 3, 4 and 6 when the clamp 1 is in a clamped state without a retaining sheet 2. The retaining sheet 2 is bent at an obtuse angle parallel to and near the edge 11. This bent shape has several advantages, including the fact that it is closely adapted to the shape of the hose wire-clamp, and thus yields a compact unit.

The hose wire-clamp 1 is first mounted to a hose, not shown, which is to be clamped onto a fitting, also not shown. The bent portions 3, 4 and the angled or bent portion 6 are pressed together in the direction of arrows 12, 13, which expands the inside diameter of the helical portions 6, 7 and allows the hose wire-clamp to be brought into the desired position. The retaining sheet 2 can be used to control this positioning. For continued assembly, the sheet can be placed with its edge 10 down against the first angled portion 3 and the third angled portion 4. Afterward, the retaining sheet 2 is pressed to the right in FIG. 1 onto the second angled portion 6, so that this portion 6 slides into the hole 9 until the connecting portion 6 assumes the illustrated position against the edge 11 of the hole 9.

Because of the distance between the two edges 10 and 11, the distance between the first angled portion 3 and the third angled portion 4, on the one hand, and the distance between the first angled portion and the second angled portion, i.e., the connecting portion 6, on the other hand, can become larger than in the state in which the hose wire-clamp 1 presses the hose onto the fitting without a retaining sheet. Thus, the retaining sheet 2 heightens the frictional lockup of the hose wire-clamp 1.

The retaining sheet 2 can be released simply from the hose wire-clamp through the backward pivoting of the retaining sheet to the left in FIG. 1, with the connecting portion 6 sliding out of the opening 9. Next, the retaining sheet can be removed from the angled portions 3 and 4, and the hose wire-clamp can be released by being squeezed in the direction of the arrows 12, 13.

The invention now being fully described, it will be apparent to one of ordinary skill in the art that many changes and modifications can be made thereto without departing from the spirit or scope of the invention as set forth herein.

I claim:

1. A hose wire-clamp arrangement comprising a hose wire-clamp that comprises a helical, resilient wire, that has at least a first end portion and a second portion that are each angled outward nearly radially or circumferentially; and a retaining sheet, having first and second spaced cutouts that are spaced in a circumferential direction of the helical resilient wire, detachably mounted to the hose wire-clamp such that each of the first and second angled portions rests directly against a respective one of the first and second cutouts.

2. The hose wire-clamp arrangement according to claim 1, wherein the distance between respective edges of the first and second cutouts that are adjacent and face one another, is at least as large as the distance between the first and second angled portions of the hose wire-clamp in the clamped state without a retaining sheet.

3. The hose wire-clamp arrangement according to claim 2 wherein the hose wire-clamp extends from the first angled portion, over a first helical portion, a connecting portion that is angled and partially curved backward in an approximate U shape, as the second angled portion, and over a second helical portion, to a third angled portion, with the first angled portion and the third angled portion lying close together and the two helical portions of the resilient wire lying between two legs of the second angled portion; the retaining sheet has, as the first cutout, an open cutout at an end surface and, at a distance from this, a hole as the second cutout in a closed portion of the retaining sheet; the first angled portion and the third angled portion of the hose wire-clamp rest against an edge of the first open cutout of the retaining sheet; and the second angled portion is clamped in the hole representing the second cutout of the retaining sheet.

4. The hose clamp arrangement according to claim 3 wherein the retaining sheet is bent at an obtuse angle parallel and near the edge of the second cutout.

5. The hose clamp arrangement according to claim 4, wherein the retaining sheet is a flat rectangular metal sheet that is bent at an obtuse angle facing in the direction of the outer surface of the hose wire clamp.

6. The hose clamp arrangement according to claim 5, wherein the first cutout is a rectangular notch in an end surface of the retaining sheet, and the second cutout is a rectangular opening formed in the surface of the flat retaining sheet and having an edge parallel to the adjacent edge of the first cutout.

7. The hose clamp arrangement according to claim 6, wherein the second cutout is disposed in the surface of the retaining sheet between the adjacent edge of the first cut out and the vertex of the obtuse angle.

8. The hose clamp arrangement according to claim 6, wherein the first and third angled portions and the second angled portion directly rest against adjacent edges of said first and second cutouts, respectively.

9. The hose wire-clamp arrangement according to claim 1, wherein the hose wire-clamp extends from the first angled portion, over a first helical portion, a connecting portion that is angled and partially curved backward in an approximate U shape, as the second angled portion, and over a second helical portion, to a third angled portion, with the first angled portion and the third angled portion lying close together and the two helical portions of the resilient wire lying between two legs of the second angled portion; the retaining sheet has, as the first cutout, an open cutout at an end surface and, at a distance from this, a hole as the second cutout in a closed portion of the retaining sheet; the first angled portion and the third angled portion of the hose wire-clamp rest against an edge the first open cutout of the retaining sheet; and the second angled portion is clamped in the hole representing the second cutout of the retaining sheet.

10. The hose clamp arrangement according to claim 9, wherein the retaining sheet is bent at an obtuse angle parallel and near the edge of the second cutout.

11. The hose clamp arrangement according to claim 10, wherein the retaining sheet is a flat rectangular metal sheet that is bent at an obtuse angle facing in the direction of the outer surface of the hose wire clamp.

12. The hose clamp arrangement according to claim 11, wherein the first cutout is a rectangular notch in an end surface of the retaining sheet, and the second cutout is a rectangular opening formed in the surface of the flat retaining sheet and having an edge parallel to the adjacent edge of the first cutout.

13. The hose clamp arrangement according to claim 12, wherein the second cutout is disposed in the surface of the retaining sheet between the adjacent edge of the first cut out and the vertex of the obtuse angle.

14. The hose clamp arrangement according to claim 12, wherein the first and third angled portions and the second angled portion directly rest against adjacent edges of said first and second cutouts, respectively.

* * * * *